J. N. Crannell,
Spring.

No. 100,122.  Patented Feb 22. 1870

Witnesses

Inventor
J. N. Crannell per

Attorneys

UNITED STATES PATENT OFFICE.

JOHN N. CRANNELL, OF CHAMPAIGN, ILLINOIS.

IMPROVED WAGON-SPRING.

Specification forming part of Letters Patent No. 100,122, dated February 22, 1870; antedated February 11, 1870.

*To all whom it may concern:*

Be it known that I, JOHN N. CRANNELL, of Champaign, in the county of Champaign and State of Illinois, have invented a new and useful Improvement in Wagon-Springs; and I do hereby declare that the following is a full, clear, and exact description thereof, which will enable others skilled in the art to make and use the same, reference being had to the accompanying drawings, forming part of this specification, in which—

Figure 1:
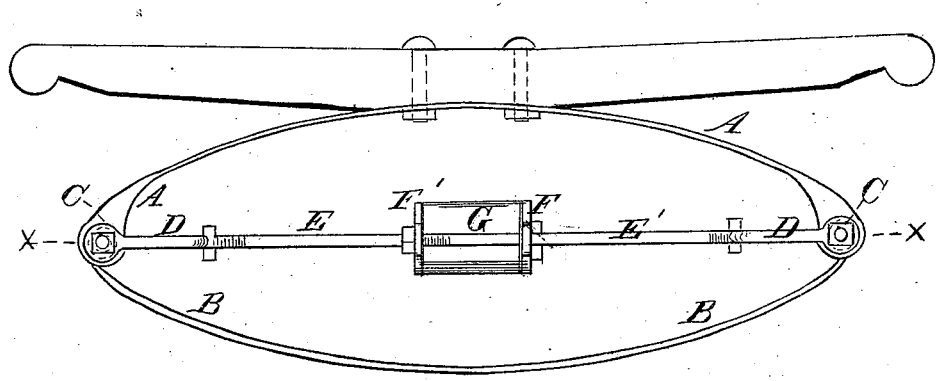
Figure 2:
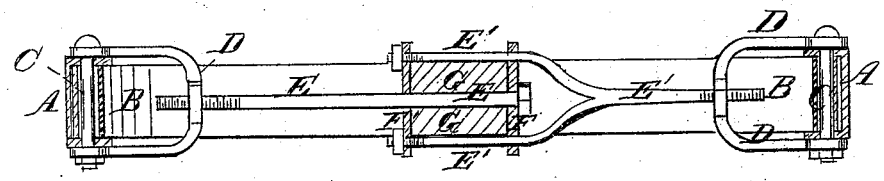
Figure 2:

Figure 1 represents a side view of my improved spring. Fig. 2 is a horizontal section of the same, taken on the plane of the line $xx$, Fig. 1.

Similar letters of reference indicate corresponding parts.

This invention relates to a new manner of strengthening elliptic springs on all kinds of vehicles without adding to their thickness, its object being to impart considerable power to light springs.

The invention consists in applying between two elliptic springs a third spring, which is held between two plates that are connected by rods with the bolt that joins the end of the elliptic springs. Thus, when the elliptic springs are flattened by a weight, the third spring will be compressed between the plates, and will add its resistance and power to that of the main springs.

The invention also consists in making the aforesaid rod lengthwise adjustable, so that the strength of the third spring can be regulated at will.

A in the drawing represents the upper and B the lower one of a pair of elliptic springs, that are at the ends connected by suitable bolts or pins C C. The springs A B are of suitable form and of single or more thicknesses. To the pins C are pivoted clevises D D, into which are screwed the ends of rods E E', as shown.

The rod E carries at its free end a plate or disk, F, and the rod E' is forked and passes through the disk F, and supports a disk, F', through which the rod E is fitted, as in Fig. 2.

A rubber or coiled spring, G, is fitted around the rod E, between the plates F F', as shown.

It is evident that the springs, when provided with this third spring, G, will be able to sustain a much greater weight than they would alone support, and the main springs can therefore be proportionately lighter. When the spring is excessively loaded the third spring forms a cushion or bumper, to prevent their being compressed.

By turning the rods E E' in the clevises, the distance between the pins C can be enlarged or diminished to more or less strain the springs.

There may, instead of the one spring G in the middle, be arranged two similar springs nearer the ends of the elliptic springs with equal or better effect.

Having thus described my invention, I claim as new and desire to secure by Letters Patent—

In combination with the springs A B and bolts C C, the clevises D D, screw and headed rod E, forked rod E', plates F F', and rubber spring G, all constructed and operated substantially as set forth.

JOHN N. CRANNELL.

Witnesses:
    JAS. WM. SHANNON,
    T. H. SLICK.